US012612721B2

(12) United States Patent
Cheng et al.

(10) Patent No.: US 12,612,721 B2
(45) Date of Patent: Apr. 28, 2026

(54) SPACE TEXTILE CLEANING EQUIPMENT AND CLEANING METHOD

(71) Applicant: SICHUAN AEROSPACE SYSTEM ENGINEERING INSTITUTE, Chengdu (CN)

(72) Inventors: Yiqian Cheng, Chengdu (CN); Qi Wang, Chengdu (CN); Sihao Qian, Chengdu (CN); Guangwei Wang, Chengdu (CN); Ping Tan, Chengdu (CN); Jin Liu, Chengdu (CN); Kai Deng, Chengdu (CN); Lin Jiang, Chengdu (CN); Zhan Xu, Chengdu (CN); Peng Li, Chengdu (CN); Qi Feng, Chengdu (CN); Dan Li, Chengdu (CN); Wani Wu, Chengdu (CN); Zhenqi Su, Chengdu (CN); Haowei Li, Chengdu (CN)

(73) Assignee: SICHUAN AEROSPACE SYSTEM ENGINEERING INSTITUTE, Chengdu (CN)

( * ) Notice: Subject to any disclaimer, the term of this patent is extended or adjusted under 35 U.S.C. 154(b) by 547 days.

(21) Appl. No.: 18/145,208

(22) Filed: Dec. 22, 2022

(65) Prior Publication Data

US 2024/0200254 A1 Jun. 20, 2024

(30) Foreign Application Priority Data

Dec. 19, 2022 (CN) .......................... 202211634771.7

(51) Int. Cl.
D06F 9/00 (2006.01)
B64G 4/00 (2006.01)
(Continued)

(52) U.S. Cl.
CPC ................. D06F 9/00 (2013.01); B64G 4/00 (2013.01); D06F 35/005 (2013.01); D06F 39/022 (2013.01)

(58) Field of Classification Search
CPC ........ D06F 9/00; D06F 35/005; D06F 39/022; B64G 4/00
See application file for complete search history.

(56) References Cited

U.S. PATENT DOCUMENTS

2004/0154355 A1* 8/2004 Hwang ..................... D06F 9/00
68/63
2005/0252255 A1* 11/2005 Gray ................... A47L 15/4219
68/145
(Continued)

FOREIGN PATENT DOCUMENTS

| CN | 105641721 | A | * | 6/2016 | ............... D06F 9/00 |
| CN | 109415864 | B | | 5/2020 | |
| CN | 111235836 | A | * | 6/2020 | ............. D06F 51/00 |

OTHER PUBLICATIONS

Machine translation of CN-111235836-A to Xie. (Year: 2020).*
Machine translation of CN-105641721-A to Wang et al. (Year: 2016).*

*Primary Examiner* — Joseph L. Perrin

(57) ABSTRACT

The disclosure relates to the technical field of laundry apparatus manufacturing, and discloses a space textile cleaning equipment and a cleaning method, comprising a washing unit consisting of: a housing, in which a fixing plate for paving the fabric and a fixing clip for clamping and fixing the paved fabric are arranged; and a scraper corresponding to the fabric, which can move along the length direction or the width direction of the fixing plate, and is also provided with an atomizing nozzle for spraying detergent, with the outlet of the atomizing nozzle corresponds to the fabric. The disclosure overcomes the problems of large water consump-
(Continued)

tion and difficult dewatering in microgravity environment in the existing washing method, solves the problem that clothes in microgravity environment can only be replaced by disposable method at present, meets the requirements of long-term long-range manned flight in the future, reduces the upward load, and is of great significance to textile cleaning in microgravity environment.

12 Claims, 3 Drawing Sheets

(51) Int. Cl.
    *D06F 35/00*         (2006.01)
    *D06F 39/02*         (2006.01)

(56)                References Cited

U.S. PATENT DOCUMENTS

| | | | |
|---|---|---|---|
| 2017/0164564 A1* | 6/2017 | Harwood | B08B 1/20 |
| 2020/0255939 A1* | 8/2020 | Khizar | D06F 39/14 |
| 2023/0151532 A1* | 5/2023 | Khizar | C09D 5/1681 |
| | | | 68/12.15 |
| 2023/0279600 A1* | 9/2023 | Palley | D06F 39/14 |
| | | | 68/5 R |
| 2024/0117558 A1* | 4/2024 | Mesa | B01D 5/006 |

* cited by examiner

1

SPACE TEXTILE CLEANING EQUIPMENT AND CLEANING METHOD

TECHNICAL FIELD

The disclosure relates to the technical field of laundry apparatus manufacturing, and more particularly to a space textile cleaning equipment and a cleaning method.

BACKGROUND

With the continuous development of manned spaceflight technology in China, it is possible to carry out longer-term manned flight missions such as long-term on-orbit residence of space stations and manned Mars boarding. Clean clothes are one of the basic conditions to ensure the physical and mental health of astronauts. However, in long-term missions, due to the limited number of upward clothes or the high cost of upward clothes, the cleaning of clothes in space needs to be solved urgently. In recent years, the United States, Russia, Europe and other space technology powers have successively carried out the second round of research on the cleaning of space textiles, which also shows the necessity of study on this problem.

Among them, the United States UMPQUA Company prepared the SPSM (Single Phase Space Machine) washing machine in 1990 for space textile cleaning, and cleaned the textiles of the International Space Station by airflow, steam and microwave rays. Subsequently, the Company proposed an improved Single Phase Space Laundry (SPSL) in 1993. But neither of them has been practically applied. In 2012, Texas A&M University Kingsville (TAMUK) in the United States also developed the GILS (Gravity Independent Laundry System) washing machine to clean clothes in a microgravity environment by using airbag shrinkage, water pipe spray and circulating heating. The Department of Aviation of the University of Cambridge has also designed an all-in-one washer-dryer for the "freedom" space station in the United States, which is also a washing equipment based on traditional washing theory and has not been applied in practice.

In collaboration with the Vienna Textile Laboratory, ESA plans to prepare antimicrobial textiles from a bacteria capable of producing secondary metabolites with antibacterial, antiviral and antifungal properties to achieve self-cleaning of fabrics. However, if the bacterium is used only as an antimicrobial textile finish, dirt such as sweat stains may still adhere to clothing and cause discomfort when worn.

S. P. Korolev Rocket and Space Corporation Energia plans to make a space laundry facility that uses $CO_2$ to wash textiles. This space laundry facility does not use water, but $CO_2$ produced by astronauts breathing on spacecraft. Special techniques will convert the $CO_2$ into liquid under high pressure to wash clothes. However, how to collect the $CO_2$ in the whole cabin and convert them into liquid under high pressure, and whether the amount of $CO_2$ in the whole cabin is sufficient for washing clothes, and how to ensure reliability and safety in this process are key issues that are difficult to overcome.

It can be seen that washing with surfactants and physical extrusion is the most commonly used washing method at present. However, this method not only consumes large amount of water and is not easy to dewater, but also causes surfactant pollution, and is not suitable for cleaning of long-term manned textiles in a space microgravity environment. At the same time, since the products in the cabin have been cleaned and sterilized before the launch of the manned aircraft, the subsequent stains are mainly generated by astronauts in the cabin. The textile cleaning in the microgravity environment is mainly aimed at human sweat stains, food oil stains, blood stains, vomitus, etc. It should not only have sterilization ability, but also meet the requirement of cleaning under the condition of extremely low water consumption considering the precious water resources in the microgravity environment.

Therefore, there is an urgent need to provide a space textile cleaning equipment and a cleaning method with low water consumption and disinfection & sterilization functions.

SUMMARY

The purpose of the disclosure is to provide a space textile cleaning equipment and a cleaning method, which overcomes the problems of large water consumption and difficult dewatering in microgravity environment in the existing washing method, solves the problem that clothes in microgravity environment can only be replaced by disposable method at present, meets the requirements of long-term long-range manned flight in the future, reduces the upward load, and is of great significance to textile cleaning in microgravity environment.

In order to achieve the purpose of the disclosure, the technical scheme adopted is as follows: a space textile cleaning equipment comprising a washing unit consisting of: a housing, in which a fixing plate for paving the fabric and a fixing clip for clamping and fixing the paved fabric are arranged; and a scraper corresponding to the fabric, which can move along the length direction or the width direction of the fixing plate, and is also provided with an atomizing nozzle for spraying detergent, with the outlet of the atomizing nozzle corresponds to the fabric.

Further, the scraper is inclined and the lower end of the scraper abuts against the fabric.

Further, the scraper is reversible within the housing.

Further, the washing unit is further provided with an ultraviolet light source corresponding to the fabric, and the detergent sprayed by the atomizing nozzle is a mixture of photocatalyst and water.

Further, the inner wall of the housing and the outer wall of the scraper have a superhydrophobic coating.

Further, two first guide rails are further provided in the housing on opposite sides of the fixing plate, the axial direction of the first guide rails is the same as the movement direction of the scraper, and both ends of the scraper are installed on the first guide rails through end shafts respectively.

Further, two sets of second guide rails are further installed on the fixing plate, the axial direction of the second guide rails is the same as the movement direction of the scraper, the two sets of second guide rails are located at both ends of the fixing plate, and there are two second guide rails in each set, which are respectively located on both sides of the fixing plate and jointly installed with a fixing shaft, with the fixing clip installed on the fixing shaft.

Further, the housing is further provided with an opening/closing door, the left and right sides of the housing are provided with slots, and both sides of the fixing plate are slidably inserted into the two slots respectively.

Further, an observation window and a control panel are further provided on the opening/closing door.

Further, the disclosure further comprises a cabinet with an open chamber, and a plurality of washing units are stacked in the chamber.

Further, a washing solution mixing chamber and a washing solution recovery filter are further provided in the cabinet, and pipelines are provided between the washing solution mixing chamber and the atomizing nozzle, and between the washing unit and the washing solution recovery filter for connection.

Further, the cabinet is further provided with a feeding port for replenishing detergent into the washing solution mixing chamber.

Further, the housing is further provided with a suction filtration device, and the washing unit is connected to the washing solution recovery filter through the suction filtration device.

Further, the cabinet is further provided with a clean water tank and a water inlet for replenishing water into the clean water tank, and the outlet end of the clean water tank is respectively connected to the washing solution mixing chamber and the atomizing nozzle.

A space textile cleaning method comprising the following steps:

Flatten and straighten the fabric, spray the mixture of photocatalyst and water on the fabric, and use ultraviolet light to irradiate the fabric. The catalyst and ultraviolet light undergo photocatalytic reaction to generate hydroxyl radicals, hole electrons and superoxide ions, which degrade and sterilize organic stains on the fabric.

The disclosure has the following beneficial effects:

1. In the washing process, the fabric to be cleaned is first paved flat on the fixing plate, then clamped and fixed on the fixing plate, and the washing solution is sprayed on the fabric through the atomizing nozzle, so that the washing solution wraps the fabric, and the stains on the fabric are removed by reaction decomposition, without the need of impact. In the whole washing process, the water consumption of each fabric only needs to wet the fabric, which not only greatly reduces the water consumption of washing, but also reduces the difficulty of dewatering.

2. By combining photocatalyst with ultraviolet light, hydroxyl radicals, hole electrons and superoxide ions are generated in the washing process, which can significantly enhance the sterilization effect. At the same time, surfactants are not necessary when cleaning the fabric to avoid such pollution.

3. By providing a superhydrophobic coating on the inner wall of the washing unit, not only the adhesion of liquid droplets is avoided, but also the photocatalytic reaction is promoted.

BRIEF DESCRIPTION OF DRAWINGS

The drawings show exemplary embodiments of the disclosure and are used in conjunction with the description to explain the principles of the disclosure. The drawings are included to provide a further understanding of the disclosure, and form an integral part of the specification.

Marks and names of corresponding parts and components as shown on the drawings.

Figure 1:
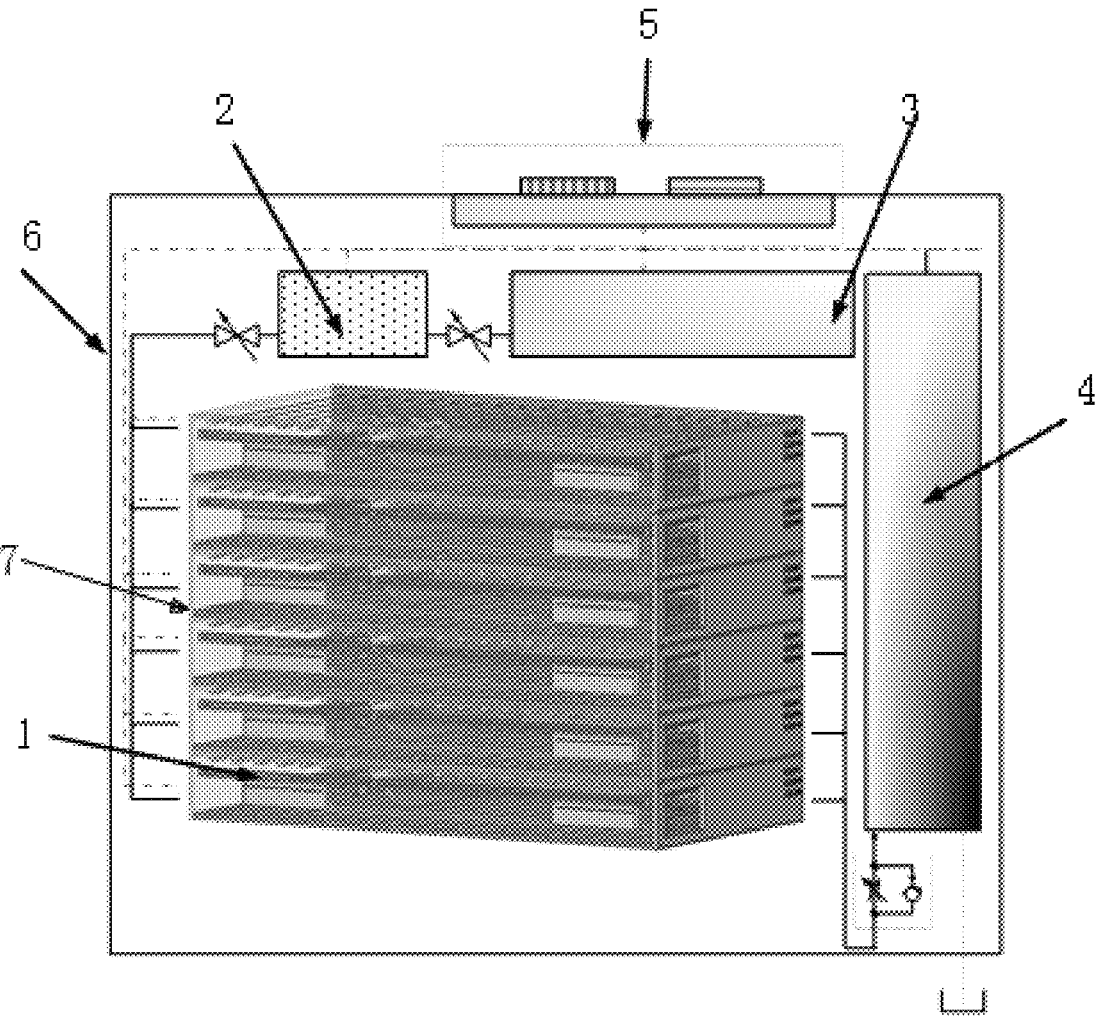
FIG. 1 is a structural schematic diagram of the space textile cleaning equipment provided in the disclosure.

1. Washing unit, 2. Washing solution mixing chamber, 3. Clean water tank, 4. Washing solution recovery filter, 5.

Electrical components, 6. Cabinet, 7. Chamber, a. Housing, b. Observation window, c. Control panel, d. Ultraviolet light source, e. Superhydrophobic coating, f. Suction filtration device, g. Fixing plate, h. Second guide rail, i. Fixing clip, j. Scraper, k. Second guide rail, l. Atomizing nozzle, m. Opening/closing door.

DETAILED DESCRIPTION OF PREFERRED EMBODIMENT

The disclosure will be further described as follows with reference to the drawings and the embodiments. It could be understood that the specific embodiments described herein are intended solely for the purpose of interpreting the relevant content and not for limiting the disclosure. It should also be noted that, for the purpose of facilitating description, only parts related to the disclosure are shown in the drawings.

It should be noted that the embodiments and features in the embodiments of the disclosure may be combined with each other in the absence of a conflict. The disclosure will be described in detail below with reference to the drawings and in combination with embodiments.

Figure 2:
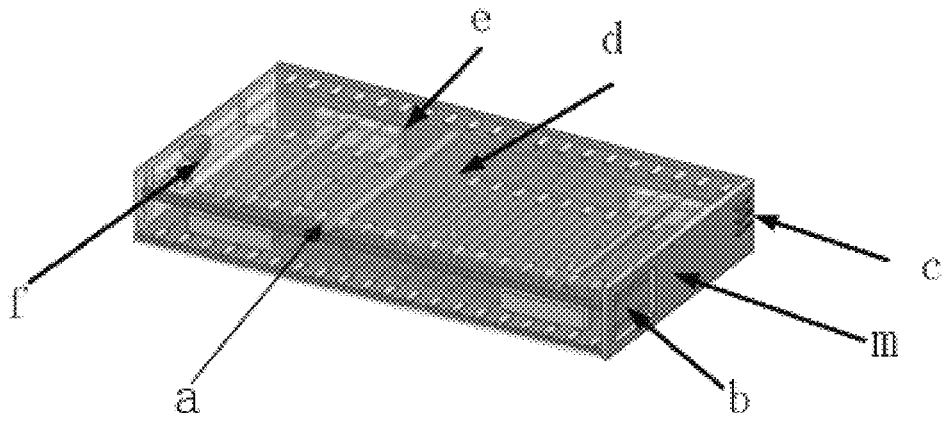
FIG. 2 is a structural schematic diagram of the washing unit.
Figure 3:
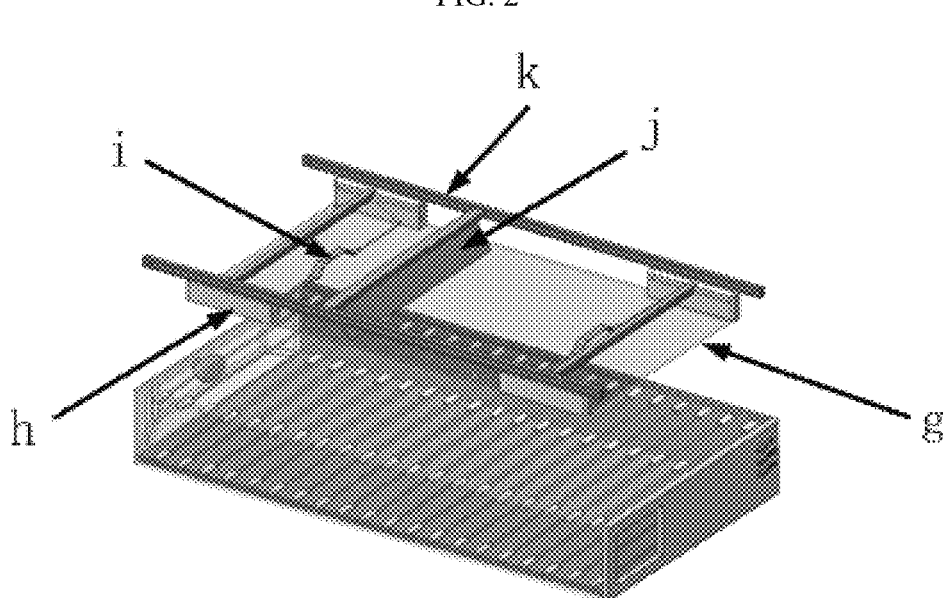
FIG. 3 is an installation diagram of the fixing plate, the scraper and the fixing clip.

As shown in FIG. 1, FIG. 2, and FIG. 3, the disclosure provides a space textile cleaning equipment, comprising washing unit 1 consisting of housing a which is a rectangular box structure, and the size of the washing unit 1 can be designed according to the length and width of the fabric; Since the body height limit of astronauts is 165 cm to 170 cm, it can be concluded that the length of the upper garment to be cleaned is generally between 600 mm and 700 mm, and the length of the lower garment to be cleaned is generally between 700 mm and 800 mm. In order to make the length of washing unit 1 at the same time meet the cleaning requirements of the upper and lower garments, the length of washing unit 1 needs to be greater than 700 mm-800 mm.

The housing a is provided with a fixing plate g, wherein the length of the fixing plate g is not less than the length of the fabric, the width of the fixing plate g is not less than the width of the fabric, and the fixing plate g is used for carrying the paving fabric. When the fabric is paving on the fixing plate g, the length direction and the width direction of the fabric are the same as the length direction and the width direction of the fixing plate g. When the fixing plate g is installed, the edge of the fixing plate g can be directly installed on the inner wall of the housing. However, in order to facilitate the ultraviolet light source d to irradiate the fabric paving on the fixing plate g in the later period and ensure that the scraper j scrapes and washes the surface of the fabric, a certain spacing is reserved between the upper surface of the fixing plate g and the inner top surface of the housing a, and a certain distance is reserved between the lower surface of the fixing plate g and the inner bottom surface of the housing a. When the fabric is paving on the fixing plate g, the fabric needs to be fixed so that the paving state of the fabric on the fixing plate g can be maintained. Therefore, housing a is also provided with fixing clip i for fixing the paved fabric. The fixing clip i can be a conventional clip, for example, the clip for holding documents. The fixing clip i can be opened under external force, and the fixing clip i can be closed through its own torsion spring without external force, so as to clamp the fabric.

In the disclosure, since the clamped part of the fabric cannot be better cleaned when the fabric is clamped and fixed by the fixing clips i, in order to reduce the clamped and fixed parts of the fabric, the upper garment can be clamped only at the collar, shoulder, sleeves and lower hem by the fixing clips i, and the lower garment can be clamped only at the waist, legs and outer seam by the fixing clips i. Since the collar and lower hem of the upper garment, and the waist and legs of the lower garment are loose, in order to ensure that one fixing clip i can clamp the collar or lower hem of the upper garment, or the waist or legs of the lower garment, the length of the clamping part of the fixing clip i should be adapted to the width of the fixing plate g, so that only two fixing clips i are required to fix the fabric when the upper or lower garment needs to be cleaned.

Figure 4:
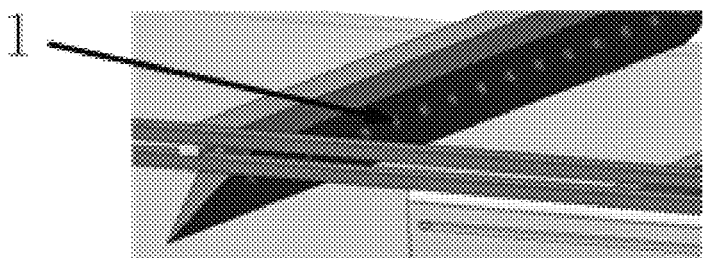
FIG. 4 is an installation diagram of the atomizing nozzle.

As shown in FIG. 2, FIG. 3, and FIG. 4, a scraper j is also arranged in housing a. When the fabric is paved and fixed on the fixing plate g, the end of the scraper j extending towards the fabric directly abuts against the surface of the fabric, and the length direction of the scraper j is consistent with the width direction of the fabric paved and fixed on the fixing plate g, and the scraper j can make reciprocating motions along the length direction of the fixing plate g. After the fabric is clamped and fixed on the fixing plate g, the scraper j reciprocates along the length direction of the fixing plate g, so that the scraper j scrapes the fabric surface. The scraper j is also provided with an atomizing nozzle l, which is located on one side of the scraper j and is used to spray detergent or clean water on the fabric. Therefore, in order to ensure that the whole fabric can be sprayed with detergent or clean water, the atomizing nozzle l can be installed at the end of the scraper j away from the fabric, and several atomizing nozzles l can be installed on the same scraper j at the same time, and such atomizing nozzles l should be evenly spaced along the length direction of the scraper j. Through the cooperation of several atomizing nozzles l, the detergent or clean water can be evenly sprayed along the width direction of the fabric, and through the cooperation between the nozzles and the movement of the scraper j, the detergent or clean water sprayed by the atomizing nozzles l can adhere to the whole fabric, so that the fabric can be completely wrapped by the detergent, and the cleaning effect can be effectively ensured. Of course, in the disclosure, the movement direction of the scraper j may also be consistent with the width direction of the fabric paved on the fixing plate g, at this time, the length direction of the scraper j is consistent with the length direction of the fabric paved on the fixing plate g. In this case, the detergent or clean water may also be sprayed on the entire fabric, and the scraper j also can scrape the fabric surface.

In order to prevent the scraper j from scraping off the detergent sprayed on the fabric with the movement of the scraper j during the process of spraying detergent or clean water on the fabric by atomizing nozzle l, no matter which side the atomizing nozzle l is located on the scraper j, when the atomizing nozzle l sprays detergent or clean water on the fabric, the scraper j moves towards the side without atomizing nozzle l. For example, when the atomizing nozzle l is located on the rear surface of the scraper j, the scraper j moves forward; If the atomizing nozzle l is located on the front surface of the scraper j, the scraper j moves backward, so that the detergent or clean water sprayed by the atomizing nozzle l is always located behind the extended end of the scraper j during the movement of the scraper j. In this process, even if the scraper j is still scraping the surface of the fabric, because the part of the fabric surface scraped by scraper j is not sprayed with detergent or clean water, so it does not affect the spraying of detergent or water, and thus does not affect the washing and rinsing of the fabric.

When the fabric needs to be cleaned, open the housing a, straighten and pave the fabric on the fixing plate g, clamp the fabric on the fixing plate g with the fixing clips i, and then close the housing; Then, the atomizing nozzle l sprays the detergent on the fabric, and during the spraying of the detergent, the scraper j moves toward the side of the scraper j on which the atomizing nozzle l is not provided, so that the extended end of the scraper j is always located in front of the detergent sprayed by the atomizing nozzle l during the movement of the scraper j, so as to prevent the scraper j from scraping off the detergent sprayed on the fabric during the movement of the scraper j; When the detergent is completely sprayed on the fabric, the detergent reacts and removes stains on the fabric; When the stains on the surface of the fabric are completely removed, the scraper j moves toward the side of the scraper j provided with the atomizing nozzle l, and the scraper j scrapes off the wastewater generated from washing the fabric while moving, thus completing the cleaning of the fabric.

When the fabric needs to be rinsed, the atomizing nozzle l sprays clean water on the fabric, and during the process of spraying clean water, the scraper j moves toward the side of the scraper j that is not provided with the atomizing nozzle l, so that the extended end of the scraper j is always in front of the clean water sprayed by the atomizing nozzle l when the scraper j moves, so as to prevent the scraper j from scraping off the clean water sprayed on the fabric during the movement of the scraper j; When the clean water is completely sprayed on the fabric, the clean water dilutes the residual stains and wastewater on the fabric; When the stains and wastewater on the fabric surface are completely diluted, the scraper j moves toward the side of the scraper j provided with the atomizing nozzle l, and the scraper j scrapes the wastewater generated from washing the fabric while moving, thus completing the rinsing of the fabric.

As a further improvement in this embodiment, as shown in FIG. 3 and FIG. 4, the scraper j is arranged in an inclined manner, that is, the extended end of the scraper j is not perpendicular to the fabric surface paved and fixed on the fixing plate g, specifically, the included angle between the scraper j and the upper surface of the fixing plate g is smaller than 90°. The side of the scraper j opposite to the fixing plate g is the inner side of the scraper j, and the atomizing nozzle l is located on the inner side of the scraper j, which not only makes the atomizing nozzle l directly act on the fabric when spraying detergent or clean water to the fabric surface, but also makes the scraper j have a better scraping effect because the extended end of the scraper j has a larger contact surface with the fabric surface when scraping off the detergent or clean water on the fabric surface.

As a further improvement in this embodiment, since the scraper j is inclined, the friction between the scraper j and the fabric surface will increase when the scraper j moves toward the side of the scraper j where the atomizing nozzle l is not provided (i.e., when the atomizing nozzle l sprays detergent or clean water on the fabric surface), in order to avoid the movement of the scraper j being affected when the atomizing nozzle l sprays detergent or clean water on the fabric, the scraper j is arranged to be reversible. When it is necessary to scrape off the detergent or wastewater on the fabric, the extended end of the scraper j abuts against the fabric; when it is necessary to spray detergent or clean water on the fabric, the scraper reverses so that there is a certain spacing between the extended end of the scraper j and the fabric surface, thereby facilitating the movement of the scraper j above the fabric.

As a further improvement of this embodiment, as shown in FIG. 3, the inner wall of housing a is provided with an ultraviolet light source d for irradiating the fabric surface. In order to ensure that the fabric clamped and fixed on the fixing plate g can be evenly irradiated by the ultraviolet light source d, there are multiple ultraviolet light sources d, which are divided into 2 groups and respectively located on both sides of the fixing plate g, and the plurality of ultraviolet light sources d in the same group are respectively located on the upper and lower sides of the fixing plate g, and evenly spaced along the length direction or the width direction of the fixing plate g. In order to ensure that the ultraviolet light sources d located under the fixing plate g can also irradiate the fabric, the fixing plate g is a light-transmitting plate.

The detergent sprayed by the atomizing nozzle l is a mixture of photocatalyst and water, specifically, the particle size of the photocatalyst is smaller than 10 nm. The photocatalyst consists of $TiO_2$ nanoparticles. Under the microgravity environment, $TiO_2$ nanoparticles will not precipitate, therefore, the mixture can be regarded as a solution. In order to avoid blocking the atomizing nozzle l when spraying the mixture with atomizing nozzle l, the aperture of the atomizing nozzle l needs to be larger than the particle size of the photocatalyst. When the atomizing nozzle l sprays the mixture of photocatalyst and water on the fabric, and under the irradiation from ultraviolet light source d, the surface of $TiO_2$ nanoparticles is rapidly excited to generate photogenerated hole-electron pairs, which are then transferred to the valence band and the conduction band respectively. Free water reacts with the photo-generated hole on the valence band of nanoparticles to form hydroxyl radicals, and oxygen molecules react with photo-generated electrons on the conduction band to form superoxide ions. These two charged groups with strong redox potential energy can make the stain fall off by reacting with organic molecules in the stain.

As a further improvement of this embodiment, the inner wall of housing a and the outer wall of the scraper j are both equipped with a superhydrophobic coating e, which is PDMSVT (Polydimethysiloxane vinyl terminated), the superhydrophobic coating e can not only directly modify the completely smooth surface with no hydrophobicity into a superhydrophobic surface, thus reducing the adhesion of liquid droplets, further promoting the generation of hydroxyl radicals in order to further improve the sterilization and disinfection effect, and further accelerating the reaction of stain molecules that are not completely degraded, to make the molecules completely degraded into small-molecule inorganics at last.

As a further improvement in this embodiment, as shown in FIG. 3 and FIG. 4, in order to ensure the reciprocating motion of the scraper j, two first guide rails k are installed in housing a, and both of the rails are located above the fixing plate g. When the movement direction of the scraper j is consistent with the length direction of the fixing plate g, the two first guide rails k are respectively located on both sides of the fixing plate g in the length direction, and the length direction of the first guide rails k coincides with the length direction of the fixing plate g; When the movement direction of the scraper j is consistent with the width direction of the fixing plate g, the two first guide rails k are respectively located on both sides of the fixing plate g in the width direction, and the length direction of the first guide rails k coincides with the width direction of the fixing plate g. The first guide rails k are in a strip shape, and have long holes penetrated along the thickness direction thereof, and the length direction of the long holes is consistent with the length direction of the first guide rails k; At the same time, both ends of the scraper j are provided with end shafts, which are circular shafts, and the two end shafts are respectively inserted into the long holes on the two first guide rails k. Through the cooperation between the end shafts and the long holes, the scraper j is always kept in a straight line during the reciprocating motion, so that the scraper j is more stable during the reciprocating motion.

In order to ensure the reciprocating motion of the scraper j, a driving structure for driving the reciprocating motion of the scraper j can also be installed in housing a. Linear driving elements can be directly adopted as a driving structure, such as an electronic telescopic rod. Hinge one end of the electronic telescopic rod with the inner wall of the housing a, fix the output end of the electronic telescopic rod with the end shaft at the end of the scraper j, and ensure that the telescopic direction of the electronic telescopic rod is consistent with the axis direction of the first guide rails k; When the electronic telescopic rod is telescoping, the output end of the electronic telescopic rod drives the end shaft at the end of the scraper j to move inside the long hole, so that the scraper j moves. Of course, in the disclosure, the driving structure for the reciprocating motion of the scraper j can also be sprocket or chain structure. For example, installing two sets of sprockets on the inner wall of the housing a, the two sets of sprockets are respectively located outside the two first guide rails k, and the two sprockets in the same set are respectively located at both ends of the first guide rail k, and the chains are wound on the two sprockets, the end shaft at the end of scraper j is fixed with the chains, and a forward and reverse rotation motor that drives any sprocket in the same set to rotate forward and reverse is installed on the housing a; When the forward and reverse rotation motor rotates, it drives one of the sprockets in the same set to rotate, and the sprocket drives the chain to rotate. At the same time, the chain pulls the end shaft at the end of the scraper j to move inside the long hole while the chain is rotating, so that the scraper j moves. Of course, the driving structure satisfying the reciprocating motion of the scraper j is not limited to the above two types, and will not be repeated here.

In order to make the reciprocating motion of the scraper j more stable, there are two driving structures for driving the reciprocating motion of the scraper j in the disclosure, and two electronic telescopic rods are respectively located at both ends of the scraper j. In order to make the scraper j turn over during the reciprocating motion, when the driving structure driving the reciprocating motion of scraper j is an electronic telescopic rod, an electric motor can also be fixedly installed at the output end of the electronic telescopic rod, and the electric motor can rotate forward or reversely. The output end of the electric motor is connected to the end shaft at the end of the scraper j through a coupling. The electronic telescopic rod drives the electric motor to move synchronously while telescoping, the electric motor drives the reciprocating motion of the scraper j and the electric motor directly drives the scraper j to turn over when rotating. When the driving structure driving the reciprocating motion of the scraper j is a sprocket and chain structure, an electric motor can be installed on the chain, and the electric motor can rotate forward or reversely. The output end of the electric motor is connected with the end shaft at the end of the scraper j through the coupling. The chain drives the electric motor to move synchronously while rotating, and the electric motor drives the reciprocating motion of the scraper j. When the electric motor rotates, the electric motor directly drives the scraper j to turn over.

As a further improvement in this embodiment, in order to meet the requirements of clamping fabrics of different lengths, as shown in FIG. 3, two sets of second guide rails h are also installed on the fixing plate g, and the two sets of second guide rails h correspond to both ends of the first guide rail k respectively. When the length direction of the first guide rail k is consistent with the length direction of the fixing plate g, the two sets of second guide rails h are respectively located at both ends of the fixing plate g; when the length direction of the first guide rail k is consistent with the width direction of the fixing plate g, the two sets of second guide rails h are respectively located on the left and right sides of the fixing plate g. The number of second guide rails h in each set is 2, and two second guide rails h in the same set are located below the two first guide rails k respectively; at the same time, the structure of the second guide rail h is the same as that of the first guide rail k, the axial direction of the second guide rail h is the same as that of the first guide rail k, the two second guide rails h in the same set share a fixing shaft, and the fixing clip i is mounted on the fixing shaft. In order to keep the fixing shaft fixed after moving along the second guide rail h, a nut can be sleeved on both ends of the fixing shaft, so that after the fixing shaft moves along the second guide rail h, the nut is tightened, and the nut is pressed against the outer wall of the second guide rail h, so that both ends of the fixing shaft are locked with the two second guide rails h respectively, thus fixing the fixing shaft. In the disclosure, when the fixing shaft can be fixed after moving along the second guide rail h, the fixing shaft can be fixed to the second guide rail h by another structure.

As a further improvement in this embodiment, in order to facilitate putting the fabric to be washed into the washing unit 1 or taking out the washed fabric from the washing unit 1, opening/closing door m can be provided on the housing a, and one side of the opening/closing door m is hinged with the housing a; at the same time, in order to ensure the tightness of interior of the housing a and the convenience of the operation when the opening/closing door m is open and closed, the structure of the opening/closing door m can be the same as the door structure on the existing washing machine. When the opening/closing door m in the disclosure is set, the width direction of the opening/closing door m is consistent with the length direction of the scraper j, that is, when the opening/closing door m is closed, the surface of the opening/closing door m is perpendicular to the movement direction of the scraper j, and both sides of the opening/closing door m are the left and right sides of the housing a; at the same time, the left and right sides of the housing a are provided with clamping slots, the cross section of the clamping slots is U-shaped, the openings of the two clamping slots face the center of the housing, and the width of the clamping slots matches the thickness of the fixing plate g. When the fixing plate g is installed, the left and right sides of the fixing plate g are slid into the two clamping slots. When the fabric needs to be taken out from housing a, the fixing plate g can be directly pulled out.

In the disclosure, the installation method of the fixing plate g can also be the partition installation method in the refrigerator on the market, that is, two convex strips are arranged on the left and right sides of housing a to replace the clamping slots. After the fixing plate g is inserted into housing a, the left and right sides of the fixing plate g are supported on the two convex strips respectively. Under this structure, the fixing plate g can be installed and it is also convenient to insert and remove the fixing plate g.

By inserting or removing the fixing plate g, the staff can pave the fabric and fix it on the fixing plate g before washing, and then install fixing plate g in housing a. After washing, the staff can also take out the fixing plate g from the housing a and then remove the washed fabric.

As a further improvement of this embodiment, an observation window b is set on the opening/closing door m, and the observation window b is made of transparent material so that the staff can observe the cleaning of the fabric through the observation window b during the cleaning process; at the same time, the opening/closing door m is further provided with a control panel c. Control panel c is electrically connected with an electric motor controlling the turning of the scraper j, an electronic telescopic rod controlling the movement of the scraper j, and an ultraviolet light source d, so that the staff can control the electric motor controlling the turning of the scraper j, the electronic telescopic rod controlling the movement of the scraper j, and the ultraviolet light source d through the control panel c.

As a further improvement of this embodiment, as shown in FIG. 1, the space textile cleaning equipment further comprises a cabinet 6 with a chamber 7, and chamber 7 has no door, so chamber 7 is always in an open state. At the same time, there is a plurality of washing units 1, which are sequentially stacked and installed in chamber 7 from bottom to top. After washing unit 1 is installed in chamber 7, the opening/closing door m on housing a is located at the opening of chamber 7, so that not only the door on washing unit 1 can open without taking out chamber 7, but also the staff can observe the cleaning of the fabric through the observation window b on the opening/closing door m during the cleaning of the fabric in the washing unit 1. In the disclosure, the space textile cleaning equipment can clean a plurality of fabrics at one time by cooperating with a plurality of washing units 1. The specific number of washing units 1 can be adjusted according to the actual situation.

As a further improvement of this embodiment, as shown in FIG. 1, cabinet 6 is also provided with a washing solution mixing chamber 2 and a washing solution recovery filter 4, wherein the washing solution mixing chamber 2 is used for mixing and preparing detergent, that is, for mixing the photocatalyst with clean water to prepare detergent, and the outlet end of the washing solution mixing chamber 2 is connected to the atomizing nozzle l through a pipe, so that the detergent mixed and prepared in the washing solution mixing chamber 2 can be directly fed into the atomizing nozzle l through a pipe, and is sprayed onto the fabric through the atomizing nozzle l, so as to complete the preparation and spraying of the detergent and ensure the cleaning of the fabric. The washing solution recovery filter 4 is mainly used for filtering wastewater after fabric cleaning or rinsing. Therefore, the inlet end of the washing solution recovery filter 4 is connected to washing unit 1 through a pipe, so that the wastewater after fabric cleaning in washing unit 1 can be directly sent to the washing solution recovery filter 4 through a pipe for filtering treatment. In order to facilitate the delivery of the detergent in the washing solution mixing chamber 2 to the atomizing nozzle l for discharge, a pump can also be installed at the outlet end of the washing solution mixing chamber 2. In order to facilitate the control of feeding the detergent in the washing solution mixing chamber 2 into the corresponding atomizing nozzle l, a plurality of atomizing nozzles l in the same washing unit 1 are connected in parallel, and a solenoid valve is installed in parallel with the plurality of atomizing nozzles l in the same washing unit 1.

As a further improvement of this embodiment, as shown in FIG. 1, cabinet 6 is further provided with a feeding port for adding detergent to the washing solution mixing chamber 2, specifically, photocatalyst or/and clean water are added to the washing solution mixing chamber 2 through the feeding port, so that the detergent can be prepared in the washing solution mixing chamber 2 before the atomizing nozzle 1 sprays detergent on the fabric and the detergent starts to work after atomizing nozzle l sprays the detergent on the fabric.

As a further improvement of this embodiment, as shown in FIG. 2 and FIG. 3, the housing a of the washing unit 1 is also provided with a suction filtration device f, and the input end of the suction filtration device f is electrically connected to the output end of the control panel c, which is controlled by the control panel c on the washing unit 1. At the same time, the suction filtration device f is an existing water pumping device, the washing solution recovery filter 4 is connected to the washing unit 1 through the suction filtration device f, and the suction filtration device f is located on the opposite side of the opening/closing door m, that is, the suction filtration device f is located on the back side of housing a. The scraper j gradually moves away from the opening/closing door m when scraping the detergent or wastewater on the fabric, that is, the detergent or wastewater scraped by the scraper j is pushed to the back of the housing a by the scraper j. By installing the suction filtration device f on the back of housing a, when the scraper j scrapes the detergent or wastewater on the fabric, the scraped detergent or wastewater will gradually approach the suction filtration device f, so that the suction filtration device f can quickly pump out the detergent or wastewater scraped by the scraper j during operation.

As a further improvement of this embodiment, as shown in FIG. 1, cabinet 6 is further provided with a clean water tank 3, which is used to store clean water. The clean water can be used to prepare detergent or directly act on the fabric for rinsing. Therefore, the outlet end of clean water tank 3 needs to be connected with the washing solution mixing chamber 2 and the atomizing nozzle l at the same time. When it is necessary to prepare the detergent, the clean water in the clean water tank 3 can be fed into the washing solution mixing chamber 2, and when it is necessary to rinse the fabric, the clean water is directly fed into the atomizing nozzle l and sprayed on the fabric through the atomizing nozzle l. In order to facilitate the control of the delivery of clean water, a solenoid valve can be installed between clean water tank 3 and washing solution mixing chamber 2, and between the clean water tank 3 and the atomizing nozzle l, and the delivery of clean water can be controlled by controlling the solenoid valve. Since the clean water for preparing the detergent can be directly fed into the washing solution mixing chamber 2 through clean water tank 3, when preparing the detergent, the feeding port can only be used to supplement the photocatalyst into the washing solution mixing chamber 2, and the clean water for preparing the detergent does not need to be supplemented into the washing solution mixing chamber 2 through the feeding port. In order to facilitate the replenishment of clean water into clean water tank 3, cabinet 6 is further provided with a water inlet connected to clean water tank 3. When the clean water in clean water tank 3 is insufficient, the clean water can be replenished into clean water tank 3 through the water inlet, which is more convenient to use. In order to deliver the clean water in clean water tank 3 to the atomizing nozzle l and washing solution mixing chamber 2, a pump is further installed at the outlet end of clean water tank 3.

In the disclosure, the clean water filtered by washing solution recovery filter 4 can be delivered to the clean water tank 3 for recycling, while the wastewater filtered by the washing solution recovery filter 4 can be directly sent out and then discharged to the wastewater collection tank of the aerospace equipment for centralized collection. In order to facilitate the control of the discharge of the wastewater and clean water filtered by the washing solution recovery filter 4, a solenoid valve can be provided at the clean water outlet of the washing solution recovery filter 4 and the wastewater outlet of the washing solution recovery filter 4, and the clean water outlet and the wastewater outlet of the washing solution recovery filter 4 can be controlled by controlling the solenoid valve.

In the disclosure, in order to facilitate the control of the preparation of detergent, the delivery of detergent, the delivery of clean water, the filtration and recovery of wastewater after fabric cleaning, and the discharge of filtered wastewater or clean water, the cabinet 6 is further provided with an electrical component 5, which includes a controller, a touch screen, a power supply interface, etc. The output end of the controller is respectively connected with the solenoid valve between the clean water tank 3 and the washing solution mixing chamber 2, the solenoid valve between the clean water tank 3 and the atomizing nozzle l, the solenoid valve at the clean water outlet of the washing solution recovery filter 4, the solenoid valve at the wastewater outlet of the washing solution recovery filter 4, the pump at the outlet end of the washing solution mixing chamber 2, the pump at the outlet end of the clean water tank 3, the washing solution recovery filter 4, the control panel c on the washing unit 1, and other electrical components. The touch screen is bidirectionally connected to the controller, and the output end of the power supply interface is connected to the input end of the touch screen. The controller can transmit relevant information to the touch screen for display, and people can send control commands to the controller through the touch screen. After receiving the control commands, the controller sends control commands to the solenoid valves between the clean water tank 3 and the washing solution mixing chamber 2, the solenoid valves between the clean water tank 3 and the atomizing nozzle l, the solenoid valves at the clean water outlet of the washing solution recovery filter 4, the solenoid valves at the wastewater outlet of the washing solution recovery filter 4, the pump at the outlet end of the washing solution mixing chamber 2, the pump at the outlet end of the clean water tank 3, the washing solution recovery filter 4, the control panel c on the washing unit 1, and other electrical components, respectively. The power supply interface can supply power to the controller after being connected with the power supply, so as to supply power to the electrical components such as the solenoid valve between the clean water tank 3 and the washing solution mixing chamber 2, the solenoid valve between the clean water tank 3 and the atomizing nozzle l, the solenoid valve at the clean water outlet of the washing solution recovery filter 4, the solenoid valve at the wastewater outlet on the washing solution recovery filter 4, the pump at the outlet end of the washing solution mixing chamber 2, the pump at the outlet end of the clean water tank 3, the washing solution recovery filter 4, and the control panel c on the washing unit 1.

In the disclosure, since the use environment is a weightless environment, the detergent and the clean water do not leak from the inside of the housing a by gravity after the clean water or the detergent is sprayed through the atomizing nozzle l. Therefore, the tightness requirement of housing a is not as high as that of an ordinary washing machine, even when the sealing strip is not provided on housing a, the detergent and the clean water sprayed from the atomizing nozzle l do not leak from the inside of housing a, but in order to facilitate the collection of the detergent or wastewater scraped from the fabric by the scraper j, the inside of the housing a is still kept sealed in the disclosure.

The embodiment also provides a cleaning method for space textiles, and the specific steps are as follows:

1. Add water to the clean water tank 3: The water inlet is connected with the water outlet of the water storage device on the space equipment by a pipeline, and the water storage device of the space equipment delivers clean water to the clean water tank 3 through the pipeline and the water inlet, thus realizing the water replenishment of the clean water tank 3. After the water replenishment of clean water tank 3 is completed, the water storage device on the space equipment stops delivering clean water to clean water tank 3 through the pipeline and the water inlet.

2. Placement of fabric: open the opening/closing door m on housing a in washing unit 1, pull out the fixing plate g from housing a, then spread and straighten the fabric on the fixing plate g, and clamp the fabric spread on the fixing plate g with fixing clips i, and finally insert the fixing plate g spread and clamped with the fabric into the housing a through the slot on the inner wall of the housing a, and then close the opening/closing door m on the housing a in the washing unit 1.

3. Preparation of detergent: the photocatalyst is filled in washing solution mixing chamber 2 through the feeding port, after which the feeding port is closed, and a washing control signal is sent to the controller through the touch screen; the controller sends a control signal to the solenoid valve between the clean water tank 3 and the washing solution mixing chamber 2 and the pump at the outlet of the clean water tank 3, then the solenoid valve between the clean water tank 3 and the washing solution mixing chamber 2 and the pump at the outlet of the clean water tank 3 are switched on, and the pump at the outlet of the clean water tank 3 pumps the clean water in the clean water tank 3 into the washing solution mixing chamber 2; when the clean water flowing into the washing solution mixing chamber 2 is sufficient, the controller automatically sends a control signal to the solenoid valve between the clean water tank 3 and the washing solution mixing chamber 2 and the pump at the outlet of the clean water tank 3, and the solenoid valve between the clean water tank 3 and the washing solution mixing chamber 2 and the pump at the outlet of the clean water tank 3 are switched off. The clean water flowing into the washing solution mixing chamber 2 is mixed with the photocatalyst, and as the particle size of the photocatalyst is 10 nm or less and they are under a microgravity environment, a fully miscible and stable detergent is formed.

4. Spraying washing solution: the controller automatically sends a control signal to the solenoid valve between the washing solution mixing chamber 2 and the parallel part of multiple atomizing nozzles l in the same washing unit and the pump at the outlet of the washing solution mixing chamber 2, then the solenoid valve between the washing solution mixing chamber 2 and the parallel part of multiple atomizing nozzles l in the same washing unit and the pump at the outlet of the washing solution mixing chamber 2 are switched on, and then the detergent in the washing solution mixing chamber 2 flows to the atomizing nozzles l, which start spraying the detergent. At the same time, the control panel c on washing unit 1 automatically sends a control signal to the electronic telescopic rod driving the reciprocating motion of scraper j and the electric motor driving the turning over of scraper j, after receiving the control signal, the electric motor driving the turning over of scraper j rotates in reverse, and scraper j turns upwards with its extended end far away the fabric, while the electronic telescopic rod driving the reciprocating motion of scraper j drives the scraper j move to the side with no atomizing nozzle l mounted. While the scraper j is moving, atomizing nozzles l continuously spray the detergent. As the environment is weightless, the detergent sprayed on the fabric by atomizing nozzles l will adhere to the fabric. When the electronic telescopic rod driving the reciprocating motion of scraper j drives the scraper j to move to a fixed position, the controller automatically sends a control signal to the solenoid valve between the washing solution mixing chamber 2 and the parallel part of multiple atomizing nozzles l in the same washing unit and the pump at the outlet of the washing solution mixing chamber 2, then the solenoid valve between the washing solution mixing chamber 2 and the parallel part of multiple atomizing nozzles l in the same washing unit and the pump at the outlet of the washing solution mixing chamber 2 are switched off, and atomizing nozzles l stop spraying detergent on the fabric.

5. Cleaning and sterilization: control panel c automatically sends a control signal to the ultraviolet light source d, which will be turned on after receiving the control signal. Under the action of ultraviolet light, the surface of the photocatalyst is rapidly excited to generate photo-generated hole-electron pairs, which are then transferred to the valence band and the conduction band respectively. Free water reacts with the photo-generated hole on the valence band of nanoparticles to form hydroxyl radicals, and oxygen molecules react with photo-generated electrons on the conduction band to form superoxide ions. These two charged groups with strong redox potential energy can make the stain fall off and degrade and synchronously sterilize the organic stain on the fabric by reacting with organic molecules in the stain.

6. Wastewater collection: after the organic stain on the fabric is completely degraded, the control panel c sends a control signal to the electronic telescopic rod driving the reciprocating motion of scraper j and the electric motor driving the turning over of scraper j, and after receiving the control signal, the electric motor driving the turning over of scraper j rotates forward, and scraper j turns downward with its extended end close to the fabric, while the electronic telescopic rod driving the reciprocating motion of scraper j drives scraper j to move to the side with atomizing nozzles l mounted, and the scraper j scrapes the wastewater on the fabric while moving. The control panel c automatically sends a control signal to the suction filtration device f, and after receiving the control signal, the suction filtration device f starts up and begins to pump water. With the pumping of suction filtration device f, the water and air in the housing a flow to the suction filtration device f, and the wastewater scraped from the fabric by scraper j enters the washing solution recovery filter 4 through the suction filtration device f. The controller sends a control signal to the washing solution recovery filter 4, the solenoid valve at the clean water outlet on the washing solution recovery filter 4, and the solenoid valve at the wastewater outlet on the washing solution recovery filter 4, then the washing solution recovery filter 4, the solenoid valve at the clean water outlet on the washing solution recovery filter 4, and the solenoid valve at the wastewater outlet on the washing solution recovery filter 4 are switched on after receiving the control signal, and the wastewater enters and is filtered by the washing solution recovery filter 4. After filtration, the generated clean water is discharged from the clean water outlet on the washing solution recovery filter 4 to the clean water tank 3, and the generated wastewater is discharged from the wastewater outlet on the washing solution recovery filter 4 to the wastewater treatment device of the aerospace equipment through the pipeline for treatment. When the electronic telescopic rod driving the reciprocating motion of scraper j drives the scraper j to move to a fixed position, the scraper j scrapes all the wastewater on the fabric. At this time, the control panel c automatically sends a control signal to the electronic telescopic rod driving the reciprocating motion of scraper j, and the electronic telescopic rod driving the reciprocating motion of scraper j stops driving the reciprocating motion of scraper j after receiving the control signal.

7. Rinse: the controller automatically sends a control signal to the solenoid valve between the clean water tank 3 and the parallel part of multiple atomizing nozzles 1 in the same washing unit 1 and the pump at the outlet of the clean water tank 3, then the solenoid valve between the clean water tank 3 and the parallel part of multiple atomizing nozzles 1 in the same washing unit 1 and the pump at the outlet of the clean water tank 3 are switched on, and the clean water in the clean water tank 3 flows to atomizing nozzles 1 and atomizing nozzles 1 start spraying clean water. At the same time, the control panel c on washing unit 1 automatically sends a control signal to the electronic telescopic rod driving the reciprocating motion of scraper j and the electric motor driving the turning over of scraper j, after receiving the control signal, the electric motor driving the turning over of scraper j rotates in reverse, and scraper j turns upwards with its extended end far away the fabric, while the electronic telescopic rod driving the reciprocating motion of scraper j drives the scraper j move to the side with no atomizing nozzle 1 mounted. While the scraper j is moving, atomizing nozzles 1 continuously spray the clean water. As the environment is weightless, the clean water sprayed on the fabric by atomizing nozzles 1 will adhere to the fabric. When the electronic telescopic rod driving the reciprocating motion of scraper j drives the scraper j to move to a fixed position, the controller automatically sends a control signal to the solenoid valve between the clean water tank 3 and the parallel part of multiple atomizing nozzles 1 in the same washing unit 1 and the pump at the outlet of the clean water tank 3, then the solenoid valve between the clean water tank 3 and the parallel part of multiple atomizing nozzles 1 in the same washing unit 1 and the pump at the outlet of the clean water tank 3 are switched off, and atomizing nozzles 1 stop spraying clean water on the fabric.

8. Wastewater collection: the control panel c sends a control signal to the electronic telescopic rod driving the reciprocating motion of scraper j and the electric motor driving the turning over of scraper j, and after receiving the control signal, the electric motor driving the turning over of scraper j rotates forward, and scraper j turns downward with its extended end close to the fabric, while the electronic telescopic rod driving the reciprocating motion of scraper j drives scraper j to move to the side with atomizing nozzles 1 mounted, and the scraper j scrapes the wastewater on the fabric while moving. The control panel c automatically sends a control signal to the suction filtration device f, and after receiving the control signal, the suction filtration device f starts up and begins to pump water. With the pumping of suction filtration device f, the water and air in the housing a flow to the suction filtration device f, and the wastewater scraped from the fabric by scraper j enters the washing solution recovery filter 4 through the suction filtration device f. The controller sends a control signal to the washing solution recovery filter 4, the solenoid valve at the clean water outlet on the washing solution recovery filter 4, and the solenoid valve at the wastewater outlet on the washing solution recovery filter 4, then the washing solution recovery filter 4, the solenoid valve at the clean water outlet on the washing solution recovery filter 4, and the solenoid valve at the wastewater outlet on the washing solution recovery filter 4 are switched on after receiving the control signal, and the wastewater enters and is filtered by the washing solution recovery filter 4. After filtration, the generated clean water is discharged from the clean water outlet on the washing solution recovery filter 4 to the clean water tank 3, and the generated wastewater is discharged from the wastewater outlet on the washing solution recovery filter 4 to the wastewater treatment device of the aerospace equipment through the pipeline for treatment. When the electronic telescopic rod driving the reciprocating motion of scraper j drives the scraper j to move to a fixed position, the scraper j scrapes all the wastewater on the fabric. At this time, the control panel c automatically sends a control signal to the electronic telescopic rod driving the reciprocating motion of scraper j, and the electronic telescopic rod driving the reciprocating motion of scraper j stops driving the reciprocating motion of scraper j after receiving the control signal.

In order to study the cleaning effect of the cleaning equipment, before the cleaning equipment and cleaning method are proposed, a corresponding prototype model is manufactured on the principle of the cleaning equipment, and a ground test platform is designed. Besides, in order to reduce the corresponding cost, the fabric to be cleaned as well as the ultraviolet light source d, scraper j, atomizing nozzle 1, fixing clip i, and suction filtration device f in the cleaning equipment are provided with substitutes as follows:

| S/N | Principle prototype component | Ground test component |
| --- | --- | --- |
| 1 | Ultraviolet light source | High-pressure mercury lamp |
| 2 | Scraper | Plastic ruler |
| 3 | Atomizing nozzle | Atomizing spray bottle |
| 4 | Fixing clip | Plastic plate + clip |
| 5 | Suction filtration device | Cancel |
| 6 | Fabric | Cotton cloth |

In the test, titanium dioxide sol was prepared by sol-gel method using tetrabutyl orthotitanate (TBOT), absolute ethyl alcohol, hydrochloric acid, and water as raw materials.

Methylene blue is a chemical dye with the aqueous solution being alkaline, which can be used to produce ink and lake and for biological or bacterial tissue dyeing. With methylene blue as the stain, two to three drops of methylene blue solution are dropped on the surface of the cotton cloth, and the cotton cloth is fixed on the plastic plate with clips after drying, and then wetted with pure water by an atomizing spray bottle. Then, a sufficient amount of TiO2 sol is sprayed on the surface of the cotton cloth by the atomizing spray bottle.

As the test platform has no closed cleaning chamber, water is sprayed with an atomizing spray bottle every 10 min to avoid complete evaporation of water. The water consumed in this process is about 80 mL. Since the washing unit in the cleaning equipment is a closed structure, the loss of water due to evaporation can be avoided. Therefore, the amount of water consumed during this experiment should be much greater than the amount of water used in the washing unit of the cleaning equipment.

Based on the above test, the following indicators can be obtained:

| S/N | Item | Indicator |
|---|---|---|
| 1 | Water consumption per piece | Not greater than 500 mL |
| 2 | Consumption of washing solution | <20 mL |
| 4 | Cleaning time | <90 min |
| 5 | Power consumption | About 120 W for a single modular washing unit |
| 6 | Noise | <50 dB(A) |
| 7 | Antibacterial effect | Excellent |

According to the analysis of the above-mentioned ground test results, taking the long-sleeved T-shirt as an example, the water required for wetting a single T-shirt will not exceed 200 mL, and the water required for rinse will be within 300 mL. At the same time, through repeated tests, the overall water consumption can be lower, and even if multiple T-shirts are washed at the same time, the water required for washing 10 T-shirts or fewer can also be controlled within 5000 mL, i.e. within 5 kg.

Meanwhile, before the study on the cleaning equipment in the disclosure, the cleaning method using the cleaning equipment is compared with the existing cleaning technology, and the comparison results are listed in the following table:

The above scoring criteria are listed in the following table:

| S/N | Assessment contents | Assessment value standard ● | ◎ | ○ |
|---|---|---|---|---|
| 1 | Cleaning effect | Excellent | Average | Poor |
| 2 | Water consumption | Little (below 10 kg at a time) | Average (10-50 kg at a time) | Much (above 50 kg at a time) |
| 3 | Uplink material space required | Small | Average | Large |
| 4 | Power consumption | Low | Average | High |
| 5 | Pollution | Low | Average | High |
| 6 | Safety | No hazard | Hazard to personnel safety | Serious hazard to personnel safety |
| 7 | Noise | No impact | Certain noise | Failure to meet indicator requirements |
| 8 | Antibacterial and antivirus effect | Excellent | Average | Negligible |

Score rules: ● 5 points; ◎ 3 points; ○ 1 point.

Upon comparison, it can be concluded that the cleaning method using this cleaning equipment is optimal.

In the description of the specification, descriptions with reference to the terms "one embodiment", "some embodiments", "example", "specific example", or "some examples" mean that specific features, structures, materials or characteristics described in combination with the embodiment or example are contained in at least one embodiment or example of the present application. In the specification, the schematic expressions of the above terms do not necessarily refer to the same embodiments or examples. Moreover, the specific features, structures, materials, or characteristics described may be combined in any one or more embodiments or examples in a suitable manner. Furthermore, those of skill in the art may combine different embodiments or examples described in the specification and features of different embodiments or examples without contradiction.

| S/N | Cleaning technology | Cleaning effect | Water consumption | Uplink material space required | Power consumption | Pollution | Safety (×2) | Noise | Antibacterial and antivirus effect | Overall score | Scheme selection |
|---|---|---|---|---|---|---|---|---|---|---|---|
| 1 | Traditional laundry technology | ◎ | ○ | ◎ | ◎ | ○ | ● | ◎ | ○ | 27 | |
| 2 | Existing ultrasonic laundry technology | ● | ○ | ◎ | ○ | ◎ | ◎ | ○ | ○ | 33 | |
| 3 | Existing carbon dioxide cleaning technology | ● | ● | ○ | ○ | ● | ○ | ○ | ● | 24 | |
| 4 | Existing silver ion cleaning technology | ◎ | ○ | ● | ◎ | ● | ● | ● | ● | 37 | |
| 5 | Existing hydroxyl radical cleaning technology | ○ | ◎ | ● | ● | ● | ● | ● | ◎ | 37 | |
| 6 | This cleaning method | ◎ | ◎ | ● | ● | ● | ● | ● | ● | 41 | ✓ |

Furthermore, the terms "first" and "second" are used merely for illustrative purposes and shall not be construed as indicating or implying relative importance or as implicitly specifying the number of technical features indicated. Thus, the features defined with the terms "first" and "second" may explicitly or implicitly include at least one of these features. Unless otherwise specifically defined, "multiple" means at least two, e.g. two or three, in the description of the present application.

Those of skill in the art should understand that the above embodiments are merely for clearly describing the disclosure rather than limiting the scope of the disclosure. Those of skill in the art may make other changes or variations based on the above disclosure, which still fall within the scope of the disclosure.

What is claimed is:

1. A space textile cleaning equipment, comprising a washing unit (1) consisting of: a housing (a), in which a fixing plate (g) for paving a fabric and a fixing clip (i) for clamping and fixing the paved fabric are arranged; and a scraper (j) corresponding to the fabric, which can move along a length direction or a width direction of the fixing plate (g), and is also provided with an atomizing nozzle (l) for spraying a detergent, with an outlet of the atomizing nozzle (l) corresponding to the fabric;

wherein the space textile cleaning equipment further comprises a cabinet (6) with an open chamber (7);

wherein a washing solution mixing chamber (2) and a washing solution recovery filter (4) are further provided in the cabinet (6), and pipelines are provided between the washing solution mixing chamber (2) and the atomizing nozzle (l), and between the washing unit (1) and the washing solution recovery filter (4) for connection.

2. The space textile cleaning equipment of claim 1, wherein the scraper (j) is inclined and a lower end of the scraper (j) abuts against the fabric.

3. The space textile cleaning equipment of claim 1, wherein the scraper (j) is reversible within the housing (a).

4. The space textile cleaning equipment of claim 1, wherein the washing unit (1) is further provided with an ultraviolet light source (d) corresponding to the fabric, and the detergent sprayed by the atomizing nozzle (l) is a mixture of photocatalyst and water.

5. The space textile cleaning equipment of claim 1, wherein a outer wall of the housing (a) and a outer wall of the scraper (j) have a superhydrophobic coating (e).

6. The space textile cleaning equipment of claim 1, wherein two first guide rails (k) are further provided in the housing (a) on opposite sides of the fixing plate (g), an axial direction of the first guide rails (k) is the same as the movement direction of the scraper (j), and both ends of the scraper (j) are installed on the first guide rails (k) through end shafts respectively.

7. The space textile cleaning equipment of claim 1, wherein two sets of second guide rails (h) are further installed on the fixing plate (g), an axial direction of the second guide rails (h) is the same as the movement direction of the scraper (j), the two sets of second guide rails (h) are located at both ends of the fixing plate (g), and there are two second guide rails (h) in each set, which are respectively located on both sides of the fixing plate (g) and jointly installed with a fixing shaft, with the fixing clip (i) installed on the fixing shaft.

8. The space textile cleaning equipment of claim 1, wherein the housing (a) is further provided with an opening/closing door (m), the left and right sides of the housing (a) are provided with slots, and both sides of the fixing plate (g) are slidably inserted into the two slots respectively.

9. The space textile cleaning equipment of claim 1, wherein a plurality of washing units (1) are stacked in the chamber (7).

10. The space textile cleaning equipment of claim 1, wherein the cabinet (6) is further provided with a feeding port for replenishing detergent into the washing solution mixing chamber (2).

11. The space textile cleaning equipment of claim 1, wherein the housing (a) is further provided with a suction filtration device (f), and the washing unit (1) is connected to the washing solution recovery filter (4) through the suction filtration device (f).

12. The space textile cleaning equipment of claim 1, wherein the cabinet (6) is further provided with a clean water tank (3) and a water inlet for replenishing water into the clean water tank (3), and the outlet end of the clean water tank (3) is respectively connected with the washing solution mixing chamber (2) and the atomizing nozzle (l).

* * * * *